April 2, 1940.  W. H. MOUND  2,195,656
WHEEL SLED
Filed Jan. 19, 1939

William H. Mound
INVENTOR.
BY [signature]
ATTORNEY.

Patented Apr. 2, 1940

2,195,656

UNITED STATES PATENT OFFICE 2,195,656

WHEEL SLED

William H. Mound, Struthers, Ohio

Application January 19, 1939, Serial No. 251,729

2 Claims. (Cl. 280—8)

This invention relates to detachable wheels for children's sleds.

The principal object of this invention is the provision of a plurality of wheels adapted to be attached to the runners of a child's sled.

A further object of this invention is the provision of a positive attachment means for effectively clamping a plurality of wheels to a child's sled.

A still further object of this invention is the provision of simply constructed brackets so formed as to be readily attachable to the runners of a sled; each of the said brackets being provided with a rubber tired ball bearing wheel.

The invention shown and described herein has been designed to permit the conversion of a child's snow sled to a wheel toy so that the sled can be used upon dry pavement in a manner very similar to its normal use upon snow or ice. The invention comprises the particular means utilized in attaching the wheels to the runners of the sled and in their positioning upon the runners of the sled so that the normal steering means of the sled can be utilized to steer the sled equipped with wheels.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein—

Figure 3 is an end view of the attachment means shown in Figure 2, a portion of this view being broken away.

Figure 1:
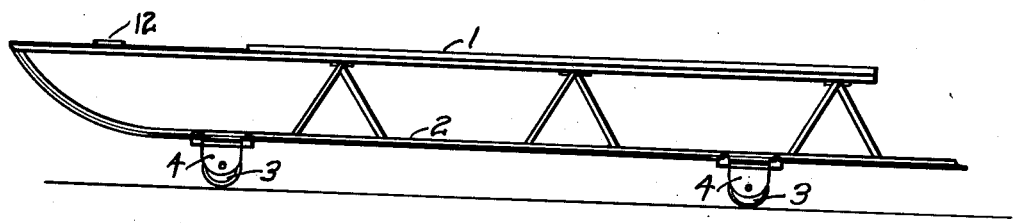
Figure 1 is a side elevation of a sled showing the wheels in position attached to the runners thereof.

By referring to the drawing and Figure 1 in particular, it will be seen that an ordinary child's sled 1, having the usual pair of parallel runners 2, has been equipped with a plurality of wheels 13. Each of the wheels is positioned upon the runners 2 by means of an attachment bar 17 which is adapted to be clamped to the runners 2.

Figure 2:
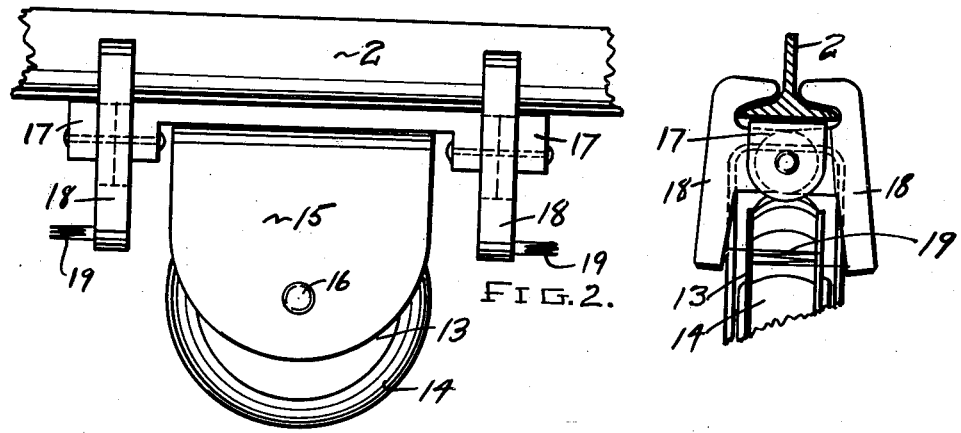
Figure 2 is a side elevation of a wheel, its bracket and attachment means, together with a section of a sled runner.

By referring to Figures 2 and 3 of the drawing, an enlarged view of the wheel and its attachment means may be seen. The wheel 13 together with its rubber tire 14 being positioned between an inverted U-shaped bracket 15 by means of an axle 16. The inverted U-shaped bracket 15 is welded or otherwise suitably affixed to an attachment bar 17 which is adapted to be positioned immediately beneath a sled runner 2. Pivoted at each end of this clamping bar 17 there is a pair of spring tensioned clamping members 18 which are shaped to conform with the upper surfaces of the horizontal portion of the runner 2 by the formation of oppositely opposed grooves 20 therein and pivoted to the clamping bar 17 in such manner that they will effectively hold this clamping bar 17 adjacent to and immediately below the bottom of the runner 2. The spring tension upon these clamping members is provided by means of coil springs 19 positioned between the lower ends of these clamping members 18 so as to normally tend to force them apart. It will thus be seen that my invention may be attached to or removed from sled runners in a short time with great ease.

The wheel itself may comprise a metallic wheel structure having a suitable bearing race provided therein and equipped with a suitable solid rubber tire as indicated at 14. In positioning each of the wheel units upon the runners of the sled it is necessary that the lower ends of the clamping members 18 be pressed together with the fingers thus effectively opening the jaw-like upper ends thereof to enable the same to be positioned about the horizontal portion of the runners 2. The lower ends of the clamping members 18 are then released and the coil springs 19 will insure the accurate and firm positioning of the wheel units upon the runners.

It has been determined that ordinarily four of these wheel units will provide adequate wheeled support to the sled 1 but it is obvious that if desirable as many more of the wheel units may be attached to the runners as desired. It will also be seen that the wheel units are preferably positioned adjacent to the vertical structure of the sled so that the support they provide is carried almost directly upon the vertical structure to the top of the sled. It will also be seen that in order to steer the sled equipped with these wheel units, it is only necessary to move the steering bar 12 of the sled; the resultant distortion of the runners 2 serving to suitably turn the front pair of wheels so that the wheeled sled may be guided. It will be obvious that the resultant steering action will be equal to that obtained in steering the sled when used on ice or snow without the wheel units and is therefore satisfactory.

It will thus be seen that I have provided a practical and efficient means of converting a child's sled into a wheeled vehicle which may be effectively steered and used on pavements in a manner similar to the sled's use upon snow or ice.

What I claim is:

1. A wheel device adapted to be attached to a sled runner and comprising a clamping bar having a pair of clamping members pivoted to each end thereof; a spring positioned between the lower ends of each pair of the said clamping members the said clamping members being adapted to engage the runner of a sled in such manner as to hold the clamping bar securely in position just below the said runner, a bracket formed on the said clamping bar and a wheel positioned on the said bracket.

2. A wheel device adapted to be attached to a sled runner and comprising a clamping bar having a pair of clamping members pivoted to each end thereof; oppositely disposed grooves formed in the upper ends on said clamping members, a spring positioned between the lower ends of each pair on said clamping members; the said clamping members being adapted to engage the runner of a sled in such manner as to hold the clamping bar securely in position just below the said runner; an inverted U-shaped bracket affixed to the said clamping bar; a wheel positioned between the arms of the said inverted U-shaped bracket.

WILLIAM H. MOUND.